No. 676,277. Patented June 11, 1901.
S. B. ROBERTSON.
JEWEL HOLDER AND FASTENING DEVICE FOR CORD COLLARS.
(Application filed Nov. 24, 1900.)
(No Model.)
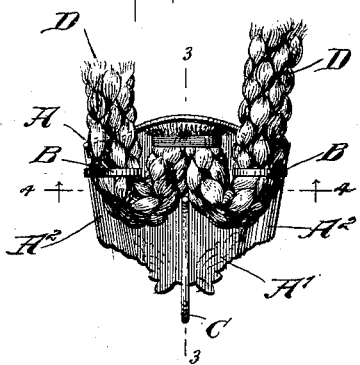
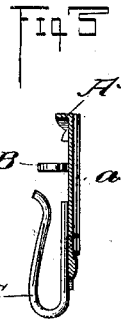
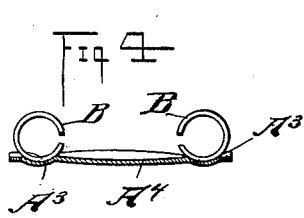
WITNESSES:
INVENTOR
Sherwood B. Robertson
BY
ATTORNEYS

UNITED STATES PATENT OFFICE.

SHERWOOD BRADLEY ROBERTSON, OF BROOKLYN, NEW YORK.

JEWEL-HOLDER AND FASTENING DEVICE FOR CORD COLLARS.

SPECIFICATION forming part of Letters Patent No. 676,277, dated June 11, 1901.

Application filed November 24, 1900. Serial No. 37,630. (No model.)

*To all whom it may concern:*

Be it known that I, SHERWOOD BRADLEY ROBERTSON, a citizen of the United States, and a resident of the city of New York, borough of Brooklyn, in the county of Kings and State of New York, have invented new and useful Improvements in Jewel-Holders and Fastening Devices for Cord Collars, of which the following is a full, clear, and exact description.

My invention relates to devices intended for use, primarily, in connection with cord collars such as worn by members of Masonic and like associations or fraternities, and has for its object to provide a simple device of the above-indicated class which will afford a neat and efficient means of holding the ends of the collar and at the same time allow of the ready attachment of ornaments or so-called "jewels," while presenting an outer surface of a size and shape suitable for the production thereon of emblems or other ornamental devices.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 illustrates the application of my improvement. Fig. 2 is a rear elevation of the improved holder. Fig. 3 is a cross-section thereof on the line 3 3 of Fig. 2, and Fig. 4 is a sectional plan on the line 4 4 of Fig. 2.

The improved holder comprises a plate $a$, made of silver or other suitable material and generally of about pentagonal shape—that is, it has irregular top and bottom edges A and A', respectively, and oblique side edges $A^2$, converging toward the bottom edge A'. Adjacent to the side edges the plate is provided upon its rear face with converging grooves $A^3$, extending from the top edge A toward the bottom edge, and at one side of each of the said grooves is located a fastening device, consisting, for instance, of a clamping-ring B, attached to the plate and made of a flexible material, so that its ends can be forced apart to form upon its inner side an opening for the reception of the cord collar D and then again brought together to hold the collar from slipping through the rings B. The grooves $A^3$ are concave, and the central portion $A^4$ of the plate is preferably also concaved, forming a recess for the reception of a portion of the cord collar D. At the lower part of said central portion $A^4$ a hook C is attached to the plate, said hook being open at its upper end. This hook has a double function—viz., first, to provide an additional fastening device or clamp for the central portion of the cord collar D, since this portion is engaged with the hook, as shown Fig. 2, and, second, to receive various ornaments or decorations (so-called "jewels," as E in Fig. 1) worn by certain members of Masonic and other societies. The front face of the plate preferably corresponds in configuration to the rear face—that is, it will have two converging convex surfaces at the sides, with a convex central field between them, so that the front face of the plate readily lends itself to ornamentation. A flange $A^5$ projects rearwardly from the plate $a$ along the top edge A.

The cord collar D, which has its ends fastened together, as shown in Fig. 2, is passed through the rings B, which are opened for this purpose and then closed again to clamp the cord in position. The jewel E is hung on the hook C and the central portion of the collar D is then engaged with the hook, thus holding said portion of the collar and at the same time preventing the escape of the jewel.

Various modifications may be made without departing from the nature of my invention as forth in the appended claims.

Having thus described my invention, I claim as new and desire to secure by Letters Patent—

1. A device of the class described, comprising a plate approximately pentagonal in shape having its central portion concaved longitudinally and provided with longitudinally-extending grooves one at each side of the center, a rearwardly-extending flange at its upper end, clamping-rings secured to the rear face of the plate between its top and bottom edges for securing a cord collar to the plate in the grooves thereof, and a hook secured to the lower central portion of the rear face of the plate, the free end of the hook projecting upward and adapted to engage the portion of the collar between the clamping-rings, substantially as described.

2. In a device of the class described, the combination of a plate provided with clamping-rings one at each side of the center, and a hook at the lower central portion and having its end extending upwardly, and a cord collar engaged by the clamping-rings and having the portion between the said rings bent upwardly and engaged by the said hook, substantially as described.

In testimony whereof I have signed my name to this specification in the presence of two subscribing witnesses.

SHERWOOD BRADLEY ROBERTSON.

Witnesses:
    FRANCES D. HAINES,
    FREDERICK W. FLOTTWELL.